(12) United States Patent
Lannutti

(10) Patent No.: US 9,249,866 B2
(45) Date of Patent: Feb. 2, 2016

(54) BELT TENSIONER FOR A POWER TRANSMISSION BELT SYSTEM

(71) Applicant: Anthony Eugene Lannutti, Fayetteville, AR (US)

(72) Inventor: Anthony Eugene Lannutti, Fayetteville, AR (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 235 days.

(21) Appl. No.: 13/835,009

(22) Filed: Mar. 15, 2013

(65) Prior Publication Data

US 2014/0274511 A1    Sep. 18, 2014

(51) Int. Cl.
   *F16H 7/12*    (2006.01)
   *F16H 7/08*    (2006.01)

(52) U.S. Cl.
   CPC .......... *F16H 7/1218* (2013.01); *F16H 2007/081* (2013.01); *F16H 2007/0846* (2013.01); *F16H 2007/0893* (2013.01)

(58) Field of Classification Search
   CPC ............... F16H 2007/0893; F16H 7/1281
   USPC .................................................. 474/133, 135
   See application file for complete search history.

(56) References Cited

U.S. PATENT DOCUMENTS

| | | | |
|---|---|---|---|
| 4,536,172 A * | 8/1985 | Burris et al. .................. | 474/135 |
| 5,236,396 A * | 8/1993 | Golovatai-Schmidt et al. .................. | 474/101 |
| 5,993,343 A * | 11/1999 | Rocca et al. .................. | 474/135 |
| 6,206,797 B1 | 3/2001 | Quintus | |
| 6,575,860 B2 | 6/2003 | Dutil | |
| 6,682,452 B2 | 1/2004 | Quintus | |
| 7,144,344 B2 | 12/2006 | Konanz | |
| 7,186,196 B2 | 3/2007 | Quintus | |
| 7,229,374 B2 | 6/2007 | Meckstroth et al. | |
| 7,637,829 B2 | 12/2009 | Stone et al. | |
| 7,887,445 B2 | 2/2011 | Quintus et al. | |
| 8,038,555 B2 | 10/2011 | Pendergrass et al. | |
| 8,075,433 B2 | 12/2011 | Quintus et al. | |
| 8,123,640 B2 | 2/2012 | Quintus et al. | |
| 8,162,787 B2 | 4/2012 | Gerring | |
| 8,187,128 B2 * | 5/2012 | Mack et al. .................. | 474/138 |
| 8,617,013 B2 | 12/2013 | Ferguson et al. | |
| 8,905,879 B2 * | 12/2014 | Lannutti et al. .............. | 474/166 |
| 2002/0119850 A1 * | 8/2002 | Dutil ............................ | 474/135 |
| 2003/0104888 A1 * | 6/2003 | Cariccia et al. .............. | 474/135 |
| 2005/0181902 A1 * | 8/2005 | Konanz ......................... | 474/135 |
| 2008/0058141 A1 * | 3/2008 | Pendergrass et al. ......... | 474/135 |
| 2008/0058142 A1 * | 3/2008 | Joslyn ......................... | 474/135 |
| 2010/0222169 A1 * | 9/2010 | Meano et al. ................. | 474/135 |
| 2013/0217525 A1 * | 8/2013 | Crist et al. ................... | 474/111 |
| 2013/0260933 A1 * | 10/2013 | Dutil et al. ................... | 474/135 |

* cited by examiner

*Primary Examiner* — William E Dondero
*Assistant Examiner* — Minh Truong
(74) *Attorney, Agent, or Firm* — Thompson Hine LLP

(57) ABSTRACT

Belt tensioners for a power transmission belt system are disclosed. The belt tensioners have a support member, an arm, a torsion spring operatively coupled therebetween, and an improved damping assembly. The arm includes a housing section pivotally mounted to the support member for rotation about the arm. This housing section has a rub surface against which the damper assembly is seated. The damper assembly has a body having a friction surface frictionally contacting the rub surface of the arm and a damper spring integrated with the body. The improvement of the damper assembly is that the rub surface of the arm includes a trough concentric about the axis of rotation and the friction surface of the body includes an annular protrusion seated in the trough.

17 Claims, 6 Drawing Sheets

Detail B

BELT TENSIONER FOR A POWER TRANSMISSION BELT SYSTEM

BACKGROUND

The present invention is directed to a belt tensioner for a transmission belt system and, more specifically, to an improved damper assembly for the belt tensioner and a method for constructing the belt tensioner incorporating the improved damper assembly.

The main purpose of a belt tensioner that automatically responds to fluctuations in the movements of an endless belt is to prolong the life of the belt itself or of engine components such as accessories operating in conjunction with the belt. Such belt tensioners are typically used in/on front-end accessory drives in an automobile engine. A front-end accessory drive often includes pulley sheaves for each accessory the belt is required to power, such as the air conditioner, water pump, fan and alternator. Each of these accessories requires varying amounts of power at various times during operation. These power variations, or torsionals, create a slackening and tightening situation of each span of the belt. The belt tensioner is utilized to absorb these torsionals through use of an internally mounted torsion spring.

Various embodiments of belt tensioners include an arm pivotally mounted to a base housing or spring case, where a torsion spring is operatively coupled between the arm and the base housing so as to force the distal end of the arm against the drive belt and, in turn, to provide sufficient tension force on the drive belt as desired. The size of torsional loads experienced by the drive belt is sometimes large enough to significantly move the arm away from the belt, causing the tension in the belt to be temporarily reduced. This is not favorable above a certain degree and squealing and squeaking of the belt may result. Therefore, typical belt tensioners incorporate damping devices to slow the pivotal movement of the arm.

In the belt tensioners illustrated and described in U.S. Pat. No. 6,575,860 and U.S. Pat. No. 6,206,797 an arm plate was included as a damping mechanism. The arm plate was deflectable or deformable to apply an axial force on other components of the tensioner, referred to herein as a deflection force. In these embodiments, when the arm plate deflection angle is less than the tapered angle of the sheath, the deflection force can only exist at the outer edge of the plate, and conversely when the arm plate deflection angle is greater than the tapered angle of the sheath, the deflection force can only exist at the edge of the plate's inner diameter. In either situation, when the sheath wears the deflection force either moves radially inward or outward, depending on where the force is applied. Since the location of the force is able to vary depending on the amount of deflection angle set during assembly and amount of wear, tensioner damping becomes increasingly difficult to manage.

An improved dampening device for belt tensioners is needed to solve these problems, especially a design where the deflection force does not move locations as the damping assembly wears over the life of the tensioner.

SUMMARY

The present invention provides a belt tensioner for a transmission belt system that includes an improved damper assembly; and, furthermore, a method for manufacturing such a belt tensioner that includes the improved damper assembly.

A first aspect of the present invention is directed to belt tensioners that have a support member, an arm, a torsion spring operatively coupled therebetween, and an improved damping assembly. The arm includes a housing section pivotally mounted to the support member for rotation about the arm. This housing section has a rub surface against which the damper assembly is seated. The damper assembly has a body having a friction surface frictionally contacting the rub surface of the arm and a damper spring integrated with the body. The improvement of the damper assembly is that the rub surface of the arm includes a trough concentric about the axis of rotation and the friction surface of the body includes an annular protrusion seated in the trough.

In one embodiment, the annular protrusion includes a wear-resistant material and is positioned below an edge of the damper spring that defines the outer diameter of the damper spring. The annular protrusion, when viewed in a longitudinal cross-section of the damper assembly, has an arcuate profile. In one embodiment, the arcuate profile is a semi-circular arc, an elliptical arc, or a lobular shape.

In one embodiment, the damper spring is an annular plate having a generally conical shape and includes a convex side facing towards the rub surface of the arm, wherein the generally conical shape of the damper spring biases the body of friction material axially against the rub surface of the arm.

In another embodiment, the body includes a plastic material and the plastic material is molded over the damper spring or coaxially molded thereto. After the molding process, the body may be a disc-shaped body of plastic material wrapped around the outer diameter of the damper spring.

In one embodiment, the support member includes a pivot shaft extending therefrom, and the damper assembly is substantially disk-shaped and is coaxially mounted on the pivot shaft. The damper spring has a center opening through which the pivot shaft extends and the center opening fixedly attaches the damper spring to the pivot shaft and thereby retains the support housing, arm, and damper assembly together.

DETAILED DESCRIPTION

Figure 1:
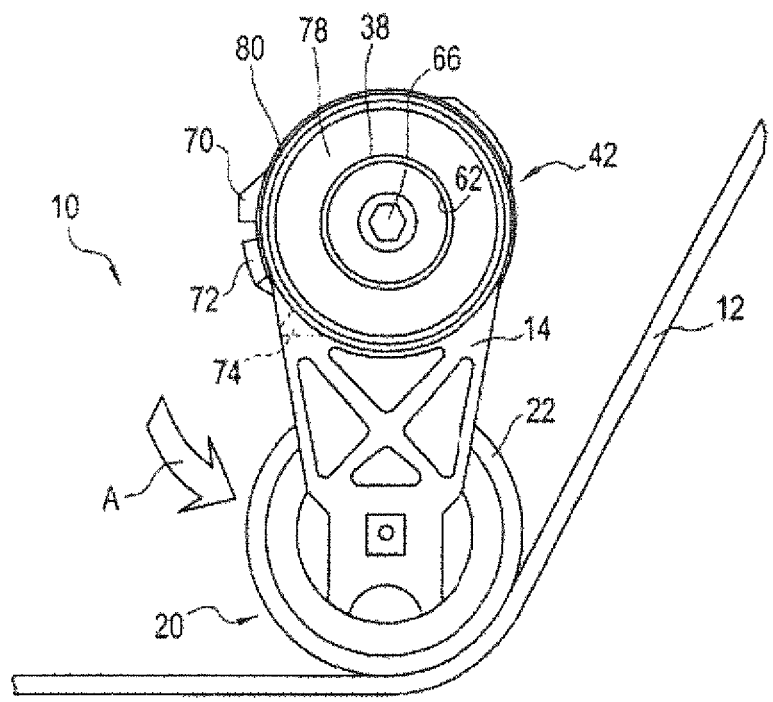
FIG. 1 is a top plan view of one embodiment of a belt tensioner acting upon a power transmission belt of a power transmission belt assembly.

The following detailed description will illustrate the general principles of the invention, examples of which are addi- Disclosed herein is an improved damper assembly for belt tensioners and methods for constructing the belt tensioners incorporating the improved damper assembly.

As shown in FIGS. 1-4, an exemplary embodiment of a belt tensioner 10 for providing a predetermined amount of tension upon a transmission belt 12 of a transmission belt system includes an arm 14 pivotally mounted to a support housing or spring case 16 and a torsion spring 18 operatively coupled between the arm 14 and the support housing 16. The torsion spring 18 applies a torsional force on the arm 14 in the direction shown by arrow A (FIG. 1), such that the distal end 20 of the arm 14 applies a corresponding tension force upon the transmission belt 12. The arm 14 and support housing 16 may be manufactured from die-cast aluminum and the torsion spring 18 may be manufactured from steel, but other suitable alternative materials (or combination of materials/components) to construct such components are also contemplated. Additionally, while the torsion spring 18 in the exemplary embodiment is a coil spring, it may be any other suitable spring, such as a flat wire spring.

Figure 2:
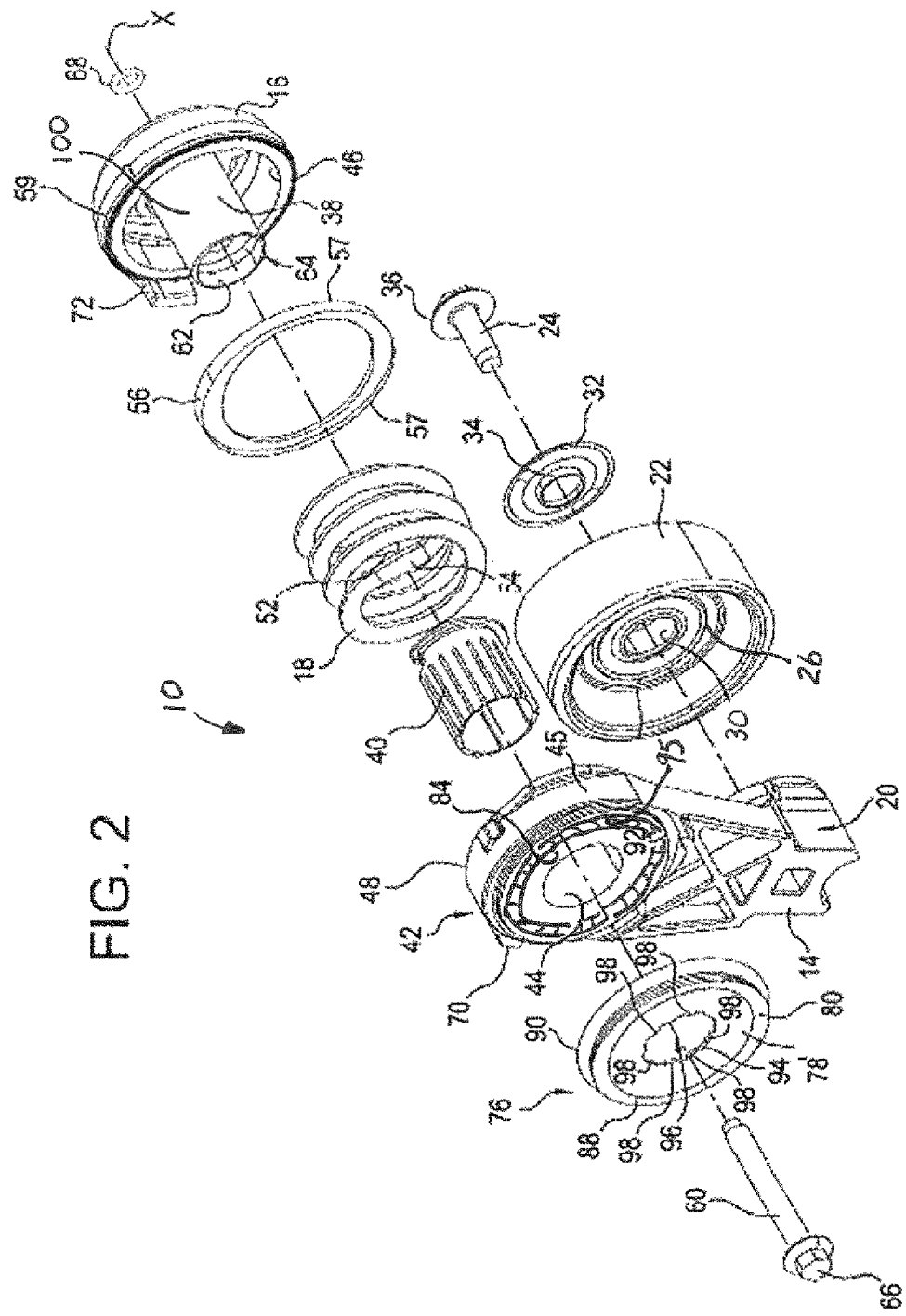
FIG. 2 is a perspective, exploded view of one embodiment of a belt tensioner having an improved damping mechanism.

As illustrated in FIGS. 1 and 2, a pulley 22 is mounted for rotation to the distal end 20 of the arm 14 by a bolt 24 extending through the hub 26 of the pulley 22 and into a threaded bore of the distal end 20 of the arm 14. The pulley 22 is preferably journaled to the distal end 20 of the arm 14 by roller bearings 30. A dust cover 32 in the shape of a washer with an annular flange 34 (FIG. 2) extending axially inwardly from the hub of the washer is coaxially mounted between the bearings 30 and the head 36 of the bolt 24 to protect the bearings 30 from contamination.

Referring again to FIGS. 1-4, the support housing 16 is generally bowl-shaped and includes a pivot shaft 38 extending coaxially upward from the inner surface of the convex side of the bowl-shaped housing. A tubular, wear resistant plastic bushing 40 is positioned around the outer circumferential surface of the pivot shaft 38. The proximal end 42 of the arm 14 is a complementary bowl-shaped pivot housing 45 that includes a cylindrical pivot tube 44 extending axially downward from the convex side thereof, where the pivot tube 44 is coaxial with the pivot shaft 38 and has an inner diameter that substantially matches (or is slightly larger than) the outer diameter of the bushing 40. Accordingly, the cylindrical pivot tube 44 is used to pivotally mount the arm 14 on the pivot shaft 38 of the support housing 16. It will be understood that while the bushing 40 in this exemplary embodiment is a wear resistant plastic, it is within the scope of the invention to use other suitable bushing materials or bearing structures.

The support housing 16 includes a circumferential outer wall 46 that mates with the complementary circumferential outer wall 48 of the pivot housing 45 of the arm 14. An annular space is provided between each of the circumferential outer walls 46, 48 and the cylindrical pivot tube 44 of the arm 14, which extends along a substantial portion of the axial length of the pivot shaft 38 extending from the support housing 16. This annular space provided within the circumferential walls 46, 48 provides an annular cavity 50 for seating the torsion spring 18 therein. A first end 52 of the torsion spring is attached to the inner surface of the support housing 16 and the opposite end 54 of the torsion spring is attached to the inner surface of the pivot housing 45 of the arm 14.

An annular outer bushing 56 formed from wear resistant plastic is positioned axially between the circumferential walls 46 of the support housing 16 and the circumferential walls 48 of the pivot housing 45 of the arm 14. The outer bushing 56, which includes axially extending annular flanges 57 seated within complementary annular grooves 59, 61 of the respective housings 16, 45, acts as a bearing surface between the circumferential outer walls 46, 48 of the respective housings 16, 45 and also acts to seal the annular cavity 50 seating the torsion spring 18 therein from external contaminants. Again, it will be understood that while the outer bushing 56 in this exemplary embodiment is a wear resistant plastic, it is within the scope of the invention to use other suitable bushing materials or bearing structures.

In the exemplary embodiment, the pivot tube 38 is a solid steel (or other suitable material, such as aluminum or powdered metal) insert that includes a center bore 58 for receiving an attachment bolt 60 therein and a larger diameter counterbore 62 extending into its upper end 64 to provide a seat for the head 66 of the attachment bolt 60 (FIG. 2) and is also useful in assembly process, as will be described in further detail below. The retaining O-ring 68 shown in FIG. 2 is used to prevent the attachment bolt 60 from exiting out from the central bore 58 of the pivot tube 38 during shipment. The outer circumferential surface of the pivot housing 45 of the arm 14 includes a radially extending projection 70 and the outer circumferential surface of the support housing 16 includes a radially projecting and upwardly extending projection 72 having an axial position substantially matching that of the projection 70 on the arm (most easily seen in FIG. 1). Accordingly, the projection 70 acts as an arm stop for abutting against the projection 72 to limit rotation of the arm 14 in the direction indicated by arrow A, thereby prohibiting the torsion spring 18 from unwinding completely. Additionally, a certain amount of rotational travel of the arm 14 is required to install the belt tensioner on the appropriate drive. Accordingly, to avoid over stressing of the torsion spring 18 during this installation process, a second radially extending projection 74 (FIG. 1) is provided on the arm 14 to limit rotation of the arm during the installation process. It will be understood by those of ordinary skill in the art that other suitable pivot assemblies for pivotally coupling the arm 14 to the support housing 16 are available and are thus within the scope of the invention.

Figure 3:
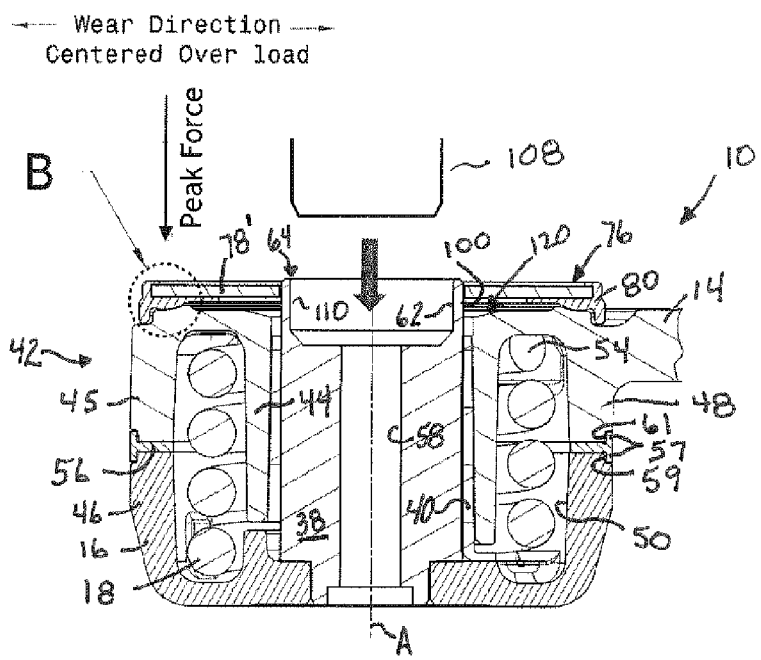
FIG. 3 is an elevational, cross-sectional view of one embodiment of a belt tensioner having an improved damping mechanism.
Figure 4:
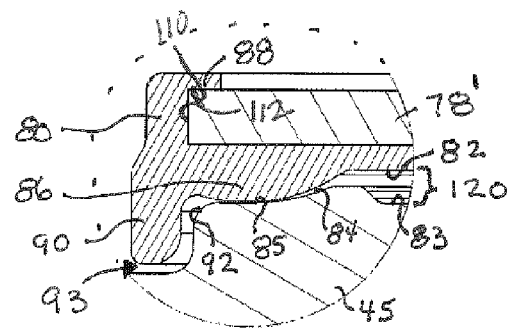
FIG. 4 is a magnified view of portion B enclosed by the circle in FIG. 3.

Referring primarily to FIGS. 2, 3 and 4, the belt tensioner 10 includes a damper assembly 76 that also acts as a clamping plate for axially clamping the various components of the belt tensioner 10 together at the proximal end 42 of the arm 14. The pivot housing 45 has an upper, exterior surface 83 facing the damper assembly 76 and upon which the damper assembly is seated. The upper surface 83 includes an annular shoulder 92 defining the outer diameter of the pivot housing 45 at the upper surface. Juxtaposed to this annular shoulder 92 is a rub surface 84 that defines a trough 85 that frictionally contacts the damper assembly 76.

The damper assembly 76 includes a damper spring, or spring plate 78, substantially in the form of a Belleville spring integrally molded with, or co-molded with an annular sheath 80. The annular sheath 80 may entirely comprise a wear resistant plastic material or at least a portion thereof may include the wear resistant plastic materials, such as a friction surface that frictionally contacts the pivot housing 45. Although not shown in the drawings, the spring plate 78 includes a plurality of teeth or projections extending radially outwardly from its outer circumferential surface and into the sheath for prohibiting rotation of the sheath 80 with respect to the spring plate 78. The spring plate 78 is, in the exemplary embodiment, a hardened steel plate and the wear resistant plastic material of the sheath 80 is, in the exemplary embodiment, a polyamide 46 nylon material. Of course, it is within the scope of the invention to utilize suitable alternative materials (or combinations of materials and components). For example, suitable alternative friction materials include, but are not limited to, all polyamides (PA) including 66 nylon, 6 nylon, 11 nylon, 12 nylon, 69 nylon, 612 nylon, and 610 nylon; polyethermides (PEI); polysulfones (PSU); polyethersulfones (PES); polyoxymethylenes (POM), or acetals; polyetheretherketones (PEEK); polyphenylene sulfides (PPS); polypthalamides (PPS), or amodels; polyphenylene sulfides (PPO); and amorphous nylons.

Figure 5:
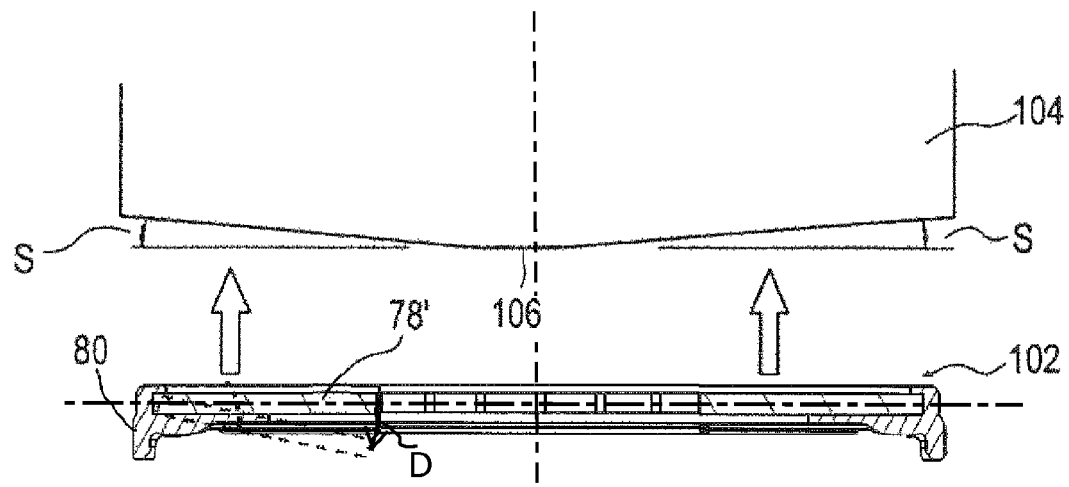
FIG. 5 illustrates a step of deforming a damping assembly.
Figure 6:
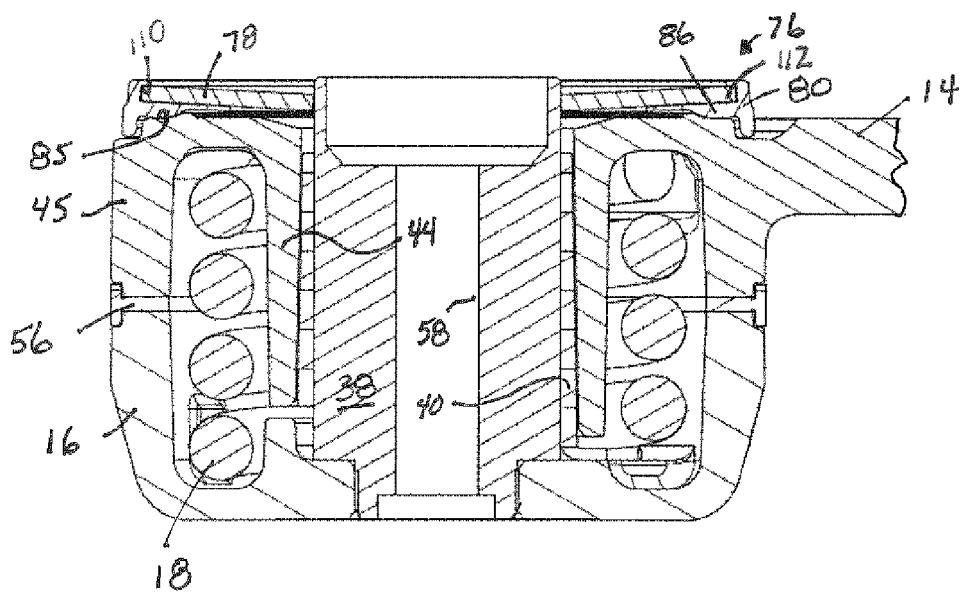
FIG. 6 is the damper assembly of FIGS. 3 and 5 after the deforming step, illustrating the conically shaped spring plate.

Referring to FIG. 5, the damper assembly 76 is constructed by first over-molding the sheath 80 over a substantially flat hardened steel washer 78', also referred to as the non-deflected spring plate 78' herein. This co-molded component 102 must then be acted upon by a deforming work piece 104 to deform the non-deflected spring plate 78' into its preferred, substantially conical shape as shown in FIG. 6. The change in the orientation of the non-deflected spring plate 78' from being perpendicular to the axis of rotation A of the tensioner to being conical, angled toward the axis of rotation A at an angle less than 90° thereto, is the deflection angle D. The work piece 104 has a substantially conical or frustoconical working end 106, where the sloping angles S of the working end 106 slope at the desired angle of deflection for the spring plate 78. The work piece 104 is coaxially applied against the co-molded piece 102 (or vise-versa) to deform the non-deflected spring plate 78' until it achieves its desired conical shape. As will be appreciated by those of ordinary skill in the art, the greater the sloping angles S, the greater the deflection angle D, the greater the biasing force to be applied by the spring plate 78.

Referring to FIGS. 2-4, the sheath 80 of the damper assembly 76, molded over the non-deflected spring plate 78' (shown prior to being deformed), includes an exterior surface 82 opposite the spring plate 78 and facing the upper surface 83 of the pivot housing 45. The exterior surface 82 is generally a planar, annular surface except for an annular protrusion 86 protruding therefrom toward the pivot housing 45. The annular protrusion 86 is disposed on the exterior surface 82 of the sheath 80 in a position that seats the protrusion 86 in the trough 85 on the pivot housing 45. In the exemplary embodiment in FIGS. 3 and 4, the protrusion 86 is positioned under the edge of the non-deflected spring plate 78' that defines the spring plate's outer diameter. As used herein, with respect to the components illustrated in FIG. 3, outer and inner are relative to the axis of rotation A, where being proximate or more proximate the axis of rotation A is "inner" and being distal or more distal the axis of rotation A is "outer." The protrusion 86 when viewed in a longitudinal cross-section of the damper assembly 76 has an arcuate profile. The arcuate profile of the protrusion may have a constant radius or a varying radius. In one embodiment, the arcuate profile is a semi-circular arc. In another embodiment, the arcuate profile is an elliptical arc. In another embodiment, the arcuate profile is a lobular shape.

As seen in FIG. 4, the sheath 80 also includes an annular clamp segment or flap 88 extending around a circumferential outer surface of the non-deflected spring plate 78' and at least partially over an upper annular surface of the non-deflected spring plate 78' so as to retain the sheath 80 to the non-deflected spring plate 78'. The sheath 80 also includes an annular bead or flange 90 extending axially downward from an outer circumference of the sheath 80 over an annular shoulder 92 extending into an upper surface of the pivot housing 45. This flange 90 completely encircles the annular shoulder 92, providing a labyrinth seal 93 between the damper assembly 76 and the arm 14. Further, while the flange 90 in the exemplary embodiment is generally in the shape of an annular bead, it is within the scope of the invention to utilize alternative shapes for the flange 90 and/or alternative structures for the labyrinth seal provided by the flange 90.

Referring back to FIG. 2, the non-deflected spring plate 78' includes a plurality of teeth 98 extending radially inwardly from the inner circumferential surface 94 of a center hole 96 extending therethrough. These teeth 98 become embedded into the outer circumferential surface 100 of the pivot shaft 38 at the upper end 64 of the pivot shaft to securely attach the damper assembly 76 to the pivot shaft 38 and, consequently, to retain the proximal end 42 of the arm 14 axially between the support housing 16 and the damper assembly 76. This, in turn, retains the torsion spring 18 within the annular chamber 50. The teeth 98 become embedded, as shown in FIG. 3, once the pivot bushing 40, outer bushing 56, housing 45 of the arm 14, torsion spring 18 and damper assembly 76 have been stacked on the support housing 16, or otherwise positioned coaxial with the pivot shaft 38, and a diametrically expanding work piece 108, having a final outer diameter slightly larger than the inner diameter of the counter-bore 62 extending into the upper end 64 of the pivot shaft 38, is positioned into the counter bore 62 and diametrically expanded such that the circumferential walls 110 of the counter bore 62 are forced radially outwardly, into the teeth 98 on the inner circumferential surface 94 of the center hole 96 extending through the deflected spring plate 78, as shown in FIG. 6, so that the teeth 98 become embedded into the circumferential walls 110, thereby fixedly attaching the deflected spring plate 78 and damper assembly 76 to the pivot shaft 38, and in turn, retaining the support housing 16, outer bushing 56, arm 14, pivot bushing 40, torsion spring 18 and damper assembly 76 altogether on the pivot shaft 36. It will be appreciated that there are other suitable coupling/retaining methods available to those of ordinary skill in the art, such as the use of radial riveting, all of which fall within the scope of the invention.

The biasing properties of the spring plate 78 (due to the substantially conical shape of the spring plate after deformation) also acts to force the annular protrusion 86 against the trough 85 in the rub surface 84, referred to herein as a deflection force. The resulting frictional engagement between the annular protrusion 86 and the trough 85 acts to dampen severe pivotal movements of the arm 14 due to the torsionals experienced by the drive belt 12. In this protrusion-trough design the annular protrusion 86 keeps the deflection force directed to a single location provided by the location of the trough 85. And, based on the annular protrusion's position, the deflection force of the damping assembly 76 is generally at the edge defining the outer diameter of the damper assembly 76, and more particularly is at the edge defining the outer diameter of the spring plate 78. The arcuate shape of the annular protrusion 86 is advantageous because it allows the damping assembly 76 to "rock over" as the non-deflected spring plate 78' is deformed into the gap 120 during assembly, i.e., the arcuate shaped annular protrusion acts much like a cantilever allowing the spring plate to pivot along its axis when the arm plate is deformed into the gap. In the embodiment illustrated in FIGS. 1-4 and 6-8, the protrusion 86, 286 or 386, respectively, is a smooth, constant diameter arc. This provides the advantage of a deflection force at a constant rate at a position where the damping force is the highest. In another embodiment, if it is preferred to have the deflection force rate increase more quickly as the arm plate is deflected, the cam may have an elliptical arc. However, in either version, the deflection force always stays in the same location which is what is desired.

As shown in the FIG. 6, the annular protrusion 86 sets firmly inside the trough 85 in the arm 14 as a result of the force applied thereto by the spring plate 78 once deflected (i.e., in its conical shape). This protrusion-trough meshing relationship does not change location regardless of the amount of wear experienced by the sheath 80 (in particular the wear of the protrusion 86) or the method of assembly. In the disclosed improved tensioner, the sheath 80 cannot be pinched between the spring plate 78 and the pivot housing 45 of the arm 14 at any point. Also, when wear of the protrusion 86 occurs, the surface area of the protrusion, and hence the protrusion to trough contact, will be increased because the tip of the arcuate surface will wear first. In this new improved tensioner, the wear that does occur at the protrusion 86 will not affect the deflection force, change the applied angle of the deflection force, as quickly or as severely as it would have in the embodiments discussed in the background section. As a result, the damping force is more reliable and consistent throughout the life of the part thereby improving engine efficiency for a longer period of time.

Figure 7:
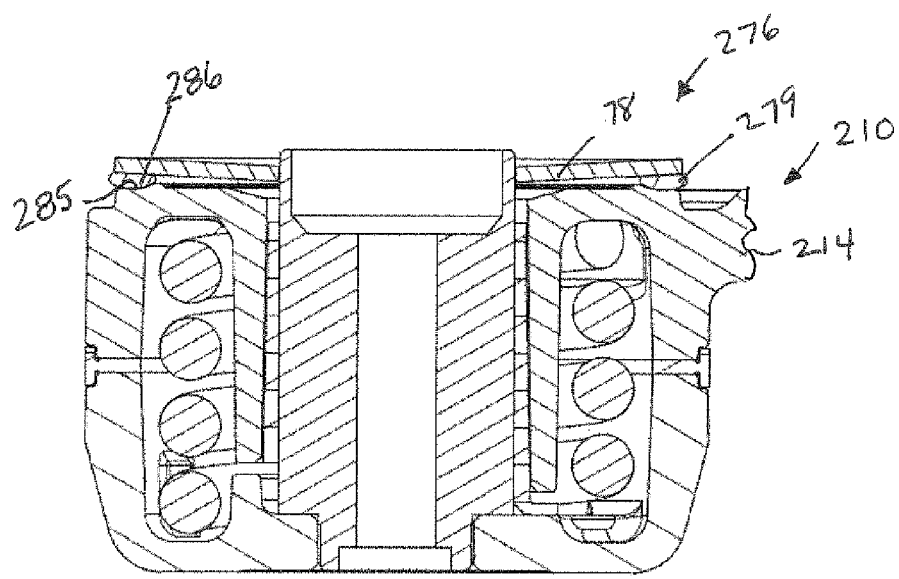
FIG. 7 is an elevational, cross-sectional view of another embodiment of a belt tensioner having an improved damping mechanism without a labyrinth seal and with the plastic material separate from the damper spring.
Figure 8:
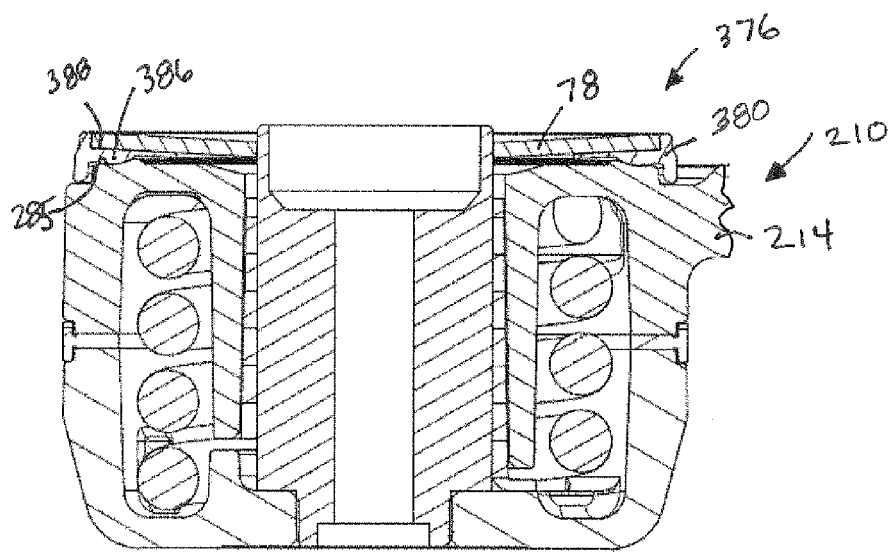
FIG. 8 is an elevational, cross-sectional view of another embodiment of a belt tensioner having an improved damping mechanism with a labyrinth seal and with the plastic material separate from the damper spring.

Above, the damping mechanism 76 was described as being a spring plate over-molded with a sheath 80. When over-molded, the sheath 80 defines a keyway 110 that has received the outer peripheral edge 112 of the non-deflected spring plate 78' or spring plate 78 therein (FIGS. 4 and 6). Over-molding, however, is not a required feature. In alternate embodiments, the non-deflected spring plate 78' or spring plate 78 may be a separate piece from the sheath 80. As illustrated in FIG. 7, the damping mechanism, generally referred to as 276, for a belt tensioner 210 includes a spring plate 78 seated on an annular ring 279 of wear resistance material(s) having an annular protrusion 286, similar to annular protrusion 86 described above, shaped and configured to seat in a trough 285 on the arm 214 of the belt tensioner 210. As illustrated in FIG. 8, the damping mechanism, generally referred to as 376, for a belt tensioner 210 includes spring plate 78 seated on an annular sheath 380 of wear resistance material(s) having an annular protrusion 386 seated in a trough 285 on the arm 214 of the belt tensioner 210. Sheath 380 is similar to sheath 80 described above, except that there is no annular clamp segment or flap 88 (see FIG. 4) extending around a circumferential outer surface of the spring plate and at least partially over an upper annular surface of the spring plate. Here, with the absence of the flap 88, the spring plate 78 may be seated within a recess 388 in the upper surface off the sheath 380 rather than being molded thereto. In these alternate embodiments, if desired, the spring plate 78 may be merely seated on, adhered to, or keyed to the annular ring 279 (FIG. 7) or sheath 380 (FIG. 8).

Figure 9:
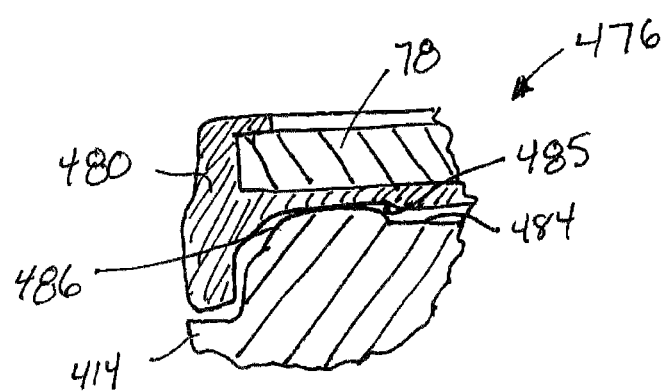
FIG. 9 is a magnified view of a portion of an alternate embodiment showing the reversal of the positions of the trough and annular protrusion.

As can be appreciated, the embodiments described above may alternately have the trough and the annular protrusions reversed, i.e., the trough is in the sheath and the annular protrusion is on the arm. As illustrated in FIG. 9, the damping mechanism, generally referred to as 476, includes a spring plate 78 seated on an annular sheath 480 of wear resistance material(s) having a trough 485, similar to trough 85 described above, shaped and configured to seat therein an annular protrusion 486, similar to annular protrusion 86, disposed on the rub surface 484 of the arm 414. While FIG. 9 is illustrated with a sheath 480, the sheath may instead be any of the alternate configurations disclosed herein such as those shown in FIGS. 7 and 8 or modifications thereof.

Some other advantages of the belt tensioner 10 and damper assembly 76 described above include, but are not limited to, an overall reduction in the amount of components needed for the belt tensioner; a reduced cost in manufacturing the belt tensioner; a damper assembly that has a dual purpose of dampening rotation of the torsion arm and coupling components of the belt tensioner to the base housing; a spring plate that has a dual purpose of dampening rotation of the torsion arm and coupling components of the belt tensioner to the base housing; a damper assembly that includes a labyrinth seal; and a single piece damper assembly utilizing a co-molded spring and friction material. It is to be understood, however, that it is not necessary to meet any or all of the identified advantages or objects of the present invention disclosed herein in order to fall within the scope of any claims, since the invention is defined by the claims and since inherent and/or unforeseen advantages of the present invention may exist even though they may not be explicitly discussed herein.

Following from the above description and summaries, it should be apparent to those of ordinary skill in the art that, while the apparatuses and processes herein described constitute exemplary embodiments of the present invention, it is to be understood that the invention is not limited to these precise apparatuses and processes, and that changes may be made therein without departing from the scope of the invention as defined by the claims. Additionally, it is to be understood that the invention is defined by the claims and it is not intended that any limitations or elements describing the exemplary embodiments herein are to be incorporated into the meaning of the claims unless such limitations or elements are specifically listed in the claims.

What is claimed is:

1. A belt tensioner comprising:
a support member;
an arm having a housing section pivotally mounted to the support member for rotation of the arm, about an axis of rotation, relative to the support member and having a belt engaging section, the housing section having a rub surface;
a torsion spring operatively coupled between the support member and the arm and disposed within a cavity defined therebetween, wherein the torsion spring biases the arm to pivot about the support member in a first direction that urges the belt engaging section against a belt;
a damper assembly comprising a body having a friction surface frictionally contacting the rub surface of the arm and a damper spring integrated with or seated on the body, wherein the damper spring is in a deformed state having at least an innermost portion deformed toward the arm and biases the friction surface of the body against the rub surface of the arm;
the improvement wherein the rub surface of the arm includes a trough having a generally arcuate-shaped cross-sectional profile concentric about the axis of rotation and the friction surface of the body includes an annular protrusion having a generally arcuate-shaped cross-sectional profile seated in the trough or the friction surface of the body includes a trough having a generally arcuate-shaped cross-sectional profile concentric about the axis of rotation and the rub surface of the arm includes an annular protrusion having a generally arcuate-shaped cross-sectional profile seated in the trough;
wherein the protrusion is dimensioned to separate the entire damper assembly from the entire rub surface of the arm except at the trough-protrusion interface, which directs application of a friction force resulting from the biasing properties of the damper spring to the location of the trough, and the protrusion is shaped and positioned to act as a cantilever that allows the damper spring to pivot the innermost portion toward the arm when deformed into the deformed state.

2. The belt tensioner of claim 1, wherein the damper spring is an annular spring plate coaxially and the body is a disc-shaped body of friction material.

3. The belt tensioner of claim 2, wherein the annular spring plate has a generally conical shape and includes a convex side facing towards the rub surface of the arm.

4. A belt tensioner comprising:
a support member;
an arm having a housing section pivotally mounted to the support member for rotation of the arm, about an axis of rotation, relative to the support member and having a belt engaging section, the housing section having a rub surface;
a torsion spring operatively coupled between the support member and the arm and disposed within a cavity defined therebetween, wherein the torsion spring biases the arm to pivot about the support member in a first direction that urges the belt engaging section against a belt;
a damper assembly comprising a body having a friction surface frictionally contacting the rub surface of the arm and a damper spring integrated with or seated on the body, wherein the damper spring is in a deformed state having at least an innermost portion deformed toward the arm and biases at least the friction surface of the body against the rub surface of the arm;
the improvement wherein a perimeter of the rub surface of the arm is defined by an annular shoulder and wherein the rub surface includes an annular trough concentric about the axis of rotation and located radially inwardly of the shoulder and the body includes an annular flange extending axially to encircle the annular shoulder of the rub surface and an annular protrusion located on the body radially inwardly of the flange and seated in the annular trough;
wherein the annular protrusion and the annular trough each have a generally arcuate shaped cross-sectional profile and are positioned to act as a cantilever that allows the damper spring to pivot the innermost portion of the damper spring toward the arm when deformed into the deformed state.

5. The belt tensioner of claim 4, wherein the annular protrusion includes a wear-resistant material.

6. The belt tensioner of claim 4, wherein the support member includes a pivot shaft extending therefrom, and the damper assembly is substantially disk-shaped and is coaxially mounted on the pivot shaft.

7. The belt tensioner of claim 6, wherein the damper spring includes a center opening through which the pivot shaft extends, and wherein the damper spring is fixedly attached to the pivot shaft.

8. The belt tensioner of claim 7, wherein a proximal end of the arm is positioned axially between the damper assembly and the support housing and wherein the fixed attachment of the damper spring to the pivot shaft retains the support housing, arm, and damper assembly together.

9. The belt tensioner of claim 4, wherein the damper spring is an annular plate having a generally conical shape and includes a convex side facing towards the rub surface of the arm, wherein the generally conical shape of the damper spring biases the body of friction material axially against the rub surface of the arm.

10. The belt tensioner of claim 4, wherein the damper spring is an annular spring plate coaxially and the body is a disc-shaped body of friction material.

11. The belt tensioner of claim 6, wherein the annular spring plate has a generally conical shape and includes a convex side facing towards the rub surface of the arm, wherein the generally conical shape of the spring plate biases the body of friction material axially against the rub surface of the arm.

12. The belt tensioner of claim 4, wherein, in a longitudinal cross-section of the damper assembly, the annular protrusion has an arcuate profile.

13. The belt tensioner of claim 12, wherein the arcuate profile is a semi-circular arc, an elliptical arc, or a lobular shape.

14. The belt tensioner of claim 4, wherein the body includes an annular flange extending at least partially axially towards the arm and encircling the annular shoulder of the arm to define a labyrinth seal between the damper assembly and the arm.

15. The belt tensioner of claim 4, wherein the body includes a plastic material and the plastic material is molded over the damper spring.

16. The belt tensioner of claim 15, wherein the body is a disc-shaped body of plastic material and the damper spring is an annular plate coaxially modeled with the disc-shaped body wrapped around the outer diameter of the damper spring.

17. The belt tensioner of claim 4, wherein, in a longitudinal cross-section of the damper assembly, the annular protrusion has an arcuate profile that is generally a semi-circular arc or an elliptical arc.

* * * * *

UNITED STATES PATENT AND TRADEMARK OFFICE
CERTIFICATE OF CORRECTION

| | |
|---|---|
| PATENT NO. | : 9,249,866 B2 |
| APPLICATION NO. | : 13/835009 |
| DATED | : February 2, 2016 |
| INVENTOR(S) | : Anthony Eugene Lannutti |

It is certified that error appears in the above-identified patent and that said Letters Patent is hereby corrected as shown below:

In the claims,

In Claim 11, Column 10, Row 19 reads:

"11. The belt tensioner of claim 6,"

It should read:

-- 11. The belt tensioner of claim 10, --

Signed and Sealed this
Fourteenth Day of June, 2016

Michelle K. Lee
*Director of the United States Patent and Trademark Office*